(12) United States Patent
Laster

(10) Patent No.: US 10,551,498 B2
(45) Date of Patent: Feb. 4, 2020

(54) WIRELESS SONAR DEVICE

(71) Applicant: Navico Holding AS, Egersund (NO)

(72) Inventor: Matthew Laster, Broken Arrow, OK (US)

(73) Assignee: NAVICO HOLDING AS, Egersund (NO)

(*) Notice: Subject to any disclaimer, the term of this patent is extended or adjusted under 35 U.S.C. 154(b) by 673 days.

(21) Appl. No.: 14/718,678

(22) Filed: May 21, 2015

(65) Prior Publication Data
US 2016/0341828 A1 Nov. 24, 2016

(51) Int. Cl.
| G01V 1/16 | (2006.01) |
| G01S 15/96 | (2006.01) |
| G01S 19/14 | (2010.01) |
| G01S 15/87 | (2006.01) |
| G01S 15/89 | (2006.01) |
| G01S 19/48 | (2010.01) |
| G01S 7/62 | (2006.01) |
| G01S 7/00 | (2006.01) |
| G01S 15/02 | (2006.01) |

(52) U.S. Cl.
CPC .............. *G01S 15/96* (2013.01); *G01S 7/003* (2013.01); *G01S 7/6281* (2013.01); *G01S 15/025* (2013.01); *G01S 15/87* (2013.01); *G01S 15/89* (2013.01); *G01S 19/14* (2013.01); *G01S 19/48* (2013.01); *G01S 15/8902* (2013.01)

(58) Field of Classification Search
USPC ........................................................ 367/188
See application file for complete search history.

(56) References Cited

U.S. PATENT DOCUMENTS

| 3,341,697 | A | 9/1967 | Noonan et al. |
| 3,610,798 | A | 10/1971 | Murphree |
| 3,713,081 | A | 1/1973 | Murphree |
| 3,781,775 | A | 12/1973 | Malloy et al. |
| 3,829,596 | A | 8/1974 | Murphree |
| 3,835,234 | A | 9/1974 | Murphree |
| 3,918,054 | A | 11/1975 | Collins |
| 4,179,681 | A | 12/1979 | Zehner et al. |
| 4,214,269 | A | 7/1980 | Parker et al. |
| 4,216,537 | A | 8/1980 | Delignieres |
| 4,271,707 | A | 6/1981 | Lakin |

(Continued)

FOREIGN PATENT DOCUMENTS

| DE | 29617813 U1 | 11/1996 |
| EP | 2602639 A1 | 6/2013 |

(Continued)

OTHER PUBLICATIONS

International Search Report and Written Opinion of International Application No. PCT/CA2016/050729 dated Aug. 26, 2016.

(Continued)

*Primary Examiner* — Isam A Alsomiri
*Assistant Examiner* — Jonathan D Armstrong
(74) *Attorney, Agent, or Firm* — Nelson Mullins Riley & Scarborough LLP

(57) ABSTRACT

A portable sonar device, which includes a waterproof housing. The waterproof housing has a conical sonar transducer element, a down-scan sonar transducer element, and a wireless data communication module for communicating with one or more wireless devices.

16 Claims, 4 Drawing Sheets

(56) References Cited

U.S. PATENT DOCUMENTS

| | | | |
|---|---|---|---|
| 4,387,365 A | 6/1983 | Berry et al. | |
| 4,510,709 A * | 4/1985 | Melcher | A01K 97/125 |
| | | | 43/17 |
| 4,597,069 A * | 6/1986 | Milano | G01S 15/96 |
| | | | 367/108 |
| 4,644,512 A * | 2/1987 | Grilk | G01S 7/56 |
| | | | 367/108 |
| 4,777,489 A | 10/1988 | Allan | |
| 4,879,697 A | 11/1989 | Lowrance et al. | |
| 4,908,800 A | 3/1990 | Dilemmo | |
| 4,926,399 A * | 5/1990 | Hickman | G10K 11/006 |
| | | | 248/230.9 |
| 4,943,951 A * | 7/1990 | Leavell | G01S 7/521 |
| | | | 367/107 |
| 4,986,755 A | 1/1991 | Johnson | |
| 5,005,419 A | 4/1991 | O'Donnell et al. | |
| 5,064,376 A | 11/1991 | DeCrescent | |
| 5,068,665 A | 11/1991 | Piazza et al. | |
| 5,107,841 A | 4/1992 | Sturgill | |
| 5,122,989 A | 6/1992 | Pirie et al. | |
| 5,142,497 A | 8/1992 | Warrow | |
| 5,173,947 A | 12/1992 | Chande et al. | |
| 5,181,026 A | 1/1993 | Granville | |
| 5,184,330 A * | 2/1993 | Adams | G01S 7/526 |
| | | | 367/111 |
| 5,200,931 A * | 4/1993 | Kosalos | G01S 7/52003 |
| | | | 367/11 |
| 5,463,597 A | 10/1995 | Harley | |
| 5,483,767 A | 1/1996 | Langer | |
| 5,493,539 A | 2/1996 | Haley et al. | |
| 5,537,380 A * | 7/1996 | Sprankle, Jr. | G01S 7/6245 |
| | | | 367/105 |
| 5,598,206 A * | 1/1997 | Bullis | G01S 15/32 |
| | | | 348/81 |
| 5,808,967 A | 9/1998 | Yu et al. | |
| 5,838,635 A | 11/1998 | Masreliez | |
| 6,222,449 B1 | 4/2001 | Twining | |
| 6,255,800 B1 | 7/2001 | Bork | |
| 6,273,771 B1 | 8/2001 | Buckley et al. | |
| 6,345,179 B1 | 2/2002 | Wiegers et al. | |
| 6,380,890 B1 | 4/2002 | Smith et al. | |
| 6,508,192 B2 | 1/2003 | Lentine | |
| 6,520,105 B2 | 2/2003 | Koda et al. | |
| 6,581,025 B2 | 6/2003 | Lehman | |
| 6,667,934 B1 | 12/2003 | Healey | |
| 6,693,847 B2 | 2/2004 | Betts | |
| 6,724,688 B2 | 4/2004 | Betts et al. | |
| 6,735,450 B1 | 5/2004 | Remmert | |
| 6,771,562 B2 | 8/2004 | Betts et al. | |
| 6,909,946 B1 | 6/2005 | Kabel et al. | |
| 7,534,152 B1 | 5/2009 | Lloyd et al. | |
| 7,538,511 B2 | 5/2009 | Samek | |
| 8,300,499 B2 | 10/2012 | Coleman et al. | |
| 8,305,840 B2 | 11/2012 | Maguire | |
| 8,645,012 B2 | 2/2014 | Salmon et al. | |
| 8,761,976 B2 | 6/2014 | Salmon et al. | |
| 8,934,318 B2 | 1/2015 | Lebedev et al. | |
| 9,360,553 B2 | 6/2016 | Lebedev et al. | |
| 9,383,444 B2 | 7/2016 | Lebedev et al. | |
| 9,408,378 B2 | 8/2016 | Senanko | |
| 9,488,728 B2 | 11/2016 | Baumann et al. | |
| 9,628,592 B2 | 4/2017 | Wu | |
| 2002/0071345 A1* | 6/2002 | Chiang | G01S 7/521 |
| | | | 367/138 |
| 2003/0012648 A1 | 1/2003 | De Facci Oliveira et al. | |
| 2003/0078706 A1* | 4/2003 | Larsen | G01C 21/00 |
| | | | 701/21 |
| 2003/0236461 A1* | 12/2003 | Poland | G01N 29/0609 |
| | | | 600/443 |
| 2004/0179332 A1 | 9/2004 | Smith et al. | |
| 2005/0084033 A1 | 4/2005 | Rosen et al. | |
| 2005/0088643 A1* | 4/2005 | Anderson | A01B 69/008 |
| | | | 356/5.01 |
| 2005/0135192 A1 | 6/2005 | Fairbairn | |
| 2005/0259515 A1 | 11/2005 | Maesawa | |
| 2006/0023570 A1 | 2/2006 | Betts et al. | |
| 2007/0147173 A1 | 6/2007 | Park | |
| 2008/0013404 A1* | 1/2008 | Acker | G01S 7/003 |
| | | | 367/88 |
| 2008/0112265 A1 | 5/2008 | Urbano et al. | |
| 2009/0037040 A1* | 2/2009 | Salmon | B63B 17/00 |
| | | | 701/21 |
| 2009/0122647 A1* | 5/2009 | Betts | G01S 7/521 |
| | | | 367/88 |
| 2009/0240354 A1 | 9/2009 | Davidson | |
| 2010/0045448 A1 | 2/2010 | Hakinami | |
| 2011/0004600 A1 | 1/2011 | Walker | |
| 2012/0020185 A1 | 1/2012 | Welker et al. | |
| 2012/0289103 A1 | 11/2012 | Hudson et al. | |
| 2013/0272093 A1 | 10/2013 | Chen et al. | |
| 2014/0022864 A1 | 1/2014 | Lebedev et al. | |
| 2014/0057677 A1* | 2/2014 | Liubinas | G01S 15/96 |
| | | | 455/556.1 |
| 2014/0066125 A1 | 3/2014 | Wu | |
| 2014/0254324 A1 | 9/2014 | Dubberley et al. | |
| 2014/0269164 A1 | 9/2014 | Betts et al. | |
| 2015/0078123 A1 | 3/2015 | Batcheller | |
| 2015/0369908 A1 | 12/2015 | Zimmerman et al. | |
| 2016/0119541 A1 | 4/2016 | Alvarado-Moya | |
| 2016/0259053 A1 | 9/2016 | Proctor et al. | |
| 2016/0341827 A1 | 11/2016 | Horner et al. | |
| 2016/0377716 A1 | 12/2016 | Proctor et al. | |
| 2017/0038460 A1 | 2/2017 | Clark et al. | |
| 2017/0082739 A1 | 3/2017 | Horner et al. | |
| 2017/0199275 A1 | 7/2017 | Wu | |
| 2017/0213459 A1 | 7/2017 | Ogaz | |
| 2018/0228454 A1 | 8/2018 | Butani et al. | |

FOREIGN PATENT DOCUMENTS

| | | | | |
|---|---|---|---|---|
| JP | H11023708 A | 1/1999 | | |
| KR | 100923668 B1 | 10/2009 | | |
| KR | 100993227 B1 | 11/2010 | | |
| WO | WO 01/53148 A1 | 7/2001 | | |
| WO | WO 2010/120896 A1 | 10/2010 | | |
| WO | WO 2011/008430 | 1/2011 | | |
| WO | WO 2013/108088 A1 | 7/2013 | | |
| WO | WO-2013108088 A1 * | 7/2013 | | G01S 15/96 |
| WO | WO 2014/019019 A1 | 2/2014 | | |
| WO | WO 2016/205938 A1 | 12/2016 | | |

OTHER PUBLICATIONS

Global FlyFisher; "Humminbird Smartcast 35" retrieved <http://globalflyfisher.com/humminbird-smartcast-35> Published Mar. 3, 2009.

Lucky; Dot Matrix Wireless Fishfinder FFW718; retrieved from https://www.amazon.co.uk/gp/product/B004HGJJ28/?tag=awp7-21, Feb. 15, 2018, Date Unknown.

Alibaba, Sonar Wireless Fish Finder, Retrieved from <https://www.alibaba.com/showroom/sonar-wireless-fish-finder.html> on Feb. 15, 2018, Date Unknown.

ReelSonar, The iBobber wireless sonar fish finder fishing tool. Retrieve Feb. 16, 2018 from <https://reelsonar.com/>, Date Uknown.

Smartcast RF15 Humminbird; http://www.smartcast-rf30.com/smartcast_rf10.htm ; retrieved Aug. 1, 2016; 2 pages.

* cited by examiner

WIRELESS SONAR DEVICE

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar has been used to detect waterborne or underwater objects. For example, sonar devices may be used to detect fish or other waterborne contacts, locate wreckage, or determine bottom topography and depth. Devices such as transducer elements, or transducers, have been developed to produce sound. These transducer elements may transmit the sound into and through the water, and they may also detect echo returns from sound that returns to the transducer elements after reflecting off of an object.

Transducer elements may convert an electrical signal into sound energy, and conversely, may convert sound energy, detected via pressure changes, into an electrical signal or sonar data. In operation, a transducer element may produce a sound pressure signal which emanates in a beam pattern such that a pressure wave is generated, where the pressure wave expands as it moves away from the source. Reflected sound may then return to the transducer element in the form of a sonar return signal, where the sonar return signal may be interpreted as a surface of an object. Transducer elements may be designed to produce different beam patterns, and they may be directed towards the seabed in various directions for navigation or target location. Display technology may also be utilized in the interpretation of sonar data representing the sonar return signals.

SUMMARY

Various implementations described herein are directed to a portable sonar device, which includes a waterproof housing. The waterproof housing has a conical sonar transducer element, a down-scan sonar transducer element, and a wireless data communication module for communicating with one or more wireless devices.

Various implementations described herein are directed to a marine electronics device, which includes a processor and a wireless data communication module configured to receive sonar data from a plurality of portable sonar transducers. Each has a conical sonar transducer element and a down-scan sonar transducer element. The marine electronics device further includes a screen configured to display the sonar data and memory having a plurality of executable instructions which, when executed by the processor, cause the processor to: process the sonar data; and display the processed sonar data on the screen.

Various implementations described herein are directed to a non-transitory computer readable medium having stored thereon a plurality of computer-executable instructions which, when executed by a computer, cause the computer to receive sonar data from a plurality of portable sonar transducers. Each transducer has a conical sonar transducer element and a down-scan sonar transducer element. The instructions further cause the computer to process the sonar data and display the processed sonar data on an electronic screen.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for a wireless sonar device used to identify the presence of fish and other various underwater creatures will now be described in more detail with reference to FIGS. 1-4 in the following paragraphs.

Figure 1:
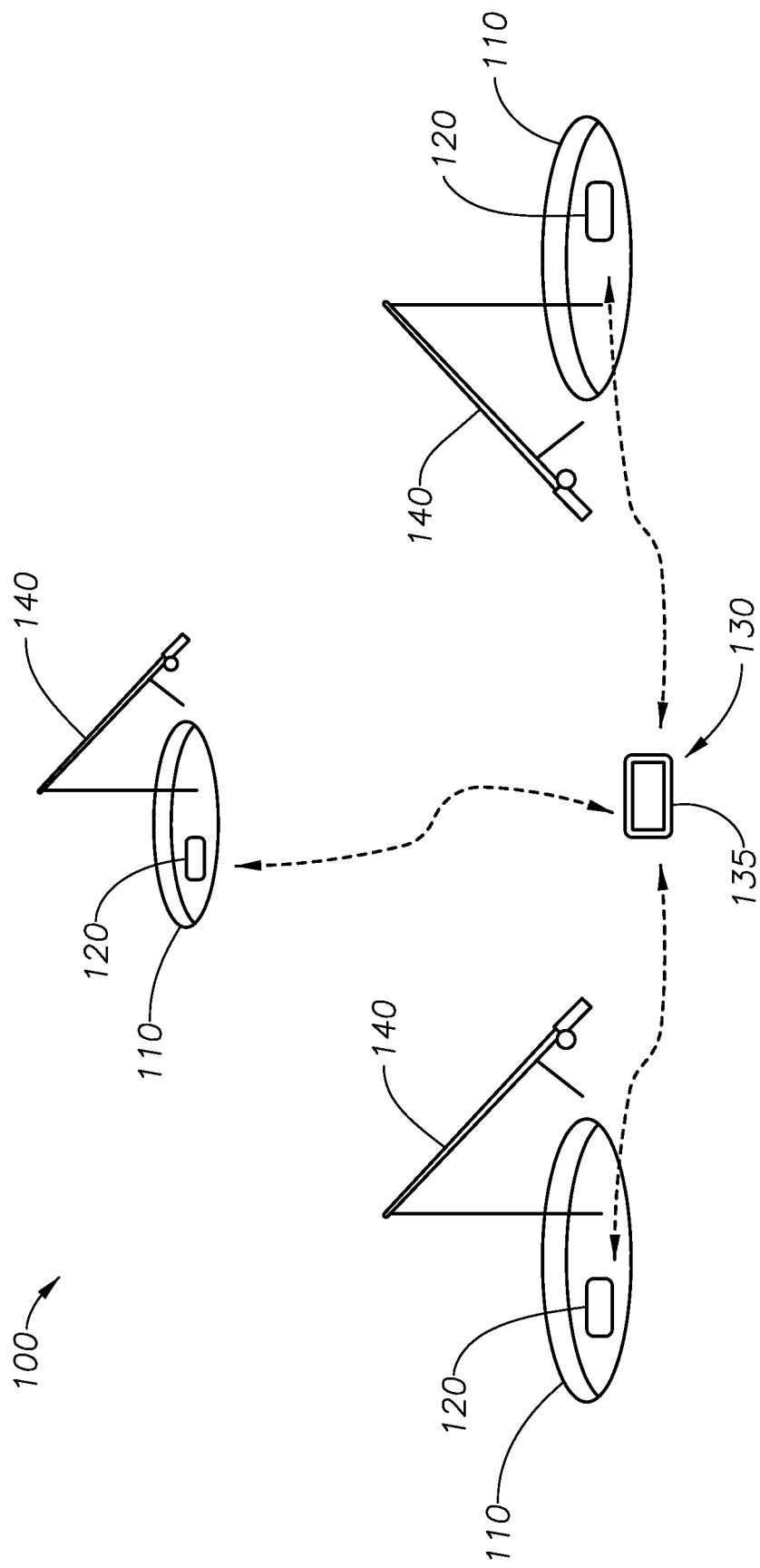
FIG. 1 illustrates a simplified diagrammatical view of ice fishing using wireless sonar devices in accordance with various implementations described herein.

FIG. 1 illustrates a simplified diagrammatical view of ice fishing using wireless sonar devices in accordance with various implementations described herein. In ice fishing, fishermen may employ a fishing technique known to as 'targeted jigging.' In targeted jigging, an ice fisherman may drill one or more holes 110 into the ice, at a location where he believes may have a higher concentration of fish. For example, fish may concentrate near an underwater feature such as a wreck, and/or where the marine environment is favorable, such as the border between high and low chlorophyll concentrations. An ice fisherman may therefore drill one or more holes 110 in the vicinity of the favorable marine environment. The fisherman may then deploy bait 140, and wireless sonar devices 120, before retiring to a centralized location 130. The centralized location 130 may be an ice hut, where he may monitor the wireless sonar devices 120 for the presence of fish. Upon detection of fish, the fisherman may return to the relevant ice hole 110, where he may begin moving the bait 140, 'targeted jigging' in an attempt to lure the fish.

After retiring to a centralized location 130, such as an ice hut, the fisherman may monitor the marine environment using the wireless device 135. In one scenario, the wireless device 135 may be a multi-function display (MFD), and the MFD may have a screen. The screen may be used to depict the sonar data from one or more wireless sonar devices 120. In another scenario, a separate wireless device 135 may be wirelessly paired with each wireless sonar device 120. In one implementation, the wireless device 135 may have a split screen where a portion displays sonar data from one type of a sonar transducer, e.g., the conical beam sonar, and another portion displays sonar data from another type, e.g., the trapezoidal beam of the down-scan sonar. Upon detection and/or identification of a fish within the sonar data, the fisherman may return to the ice hole 110 and begin moving the bait 140 in an attempt to lure the fish. While the method, system and apparatus may have been described in the context of ice fishing, it would be understood by a person of ordinary skill in the art that other various implementations described herein may be used with other applications and environments.

Figure 2:
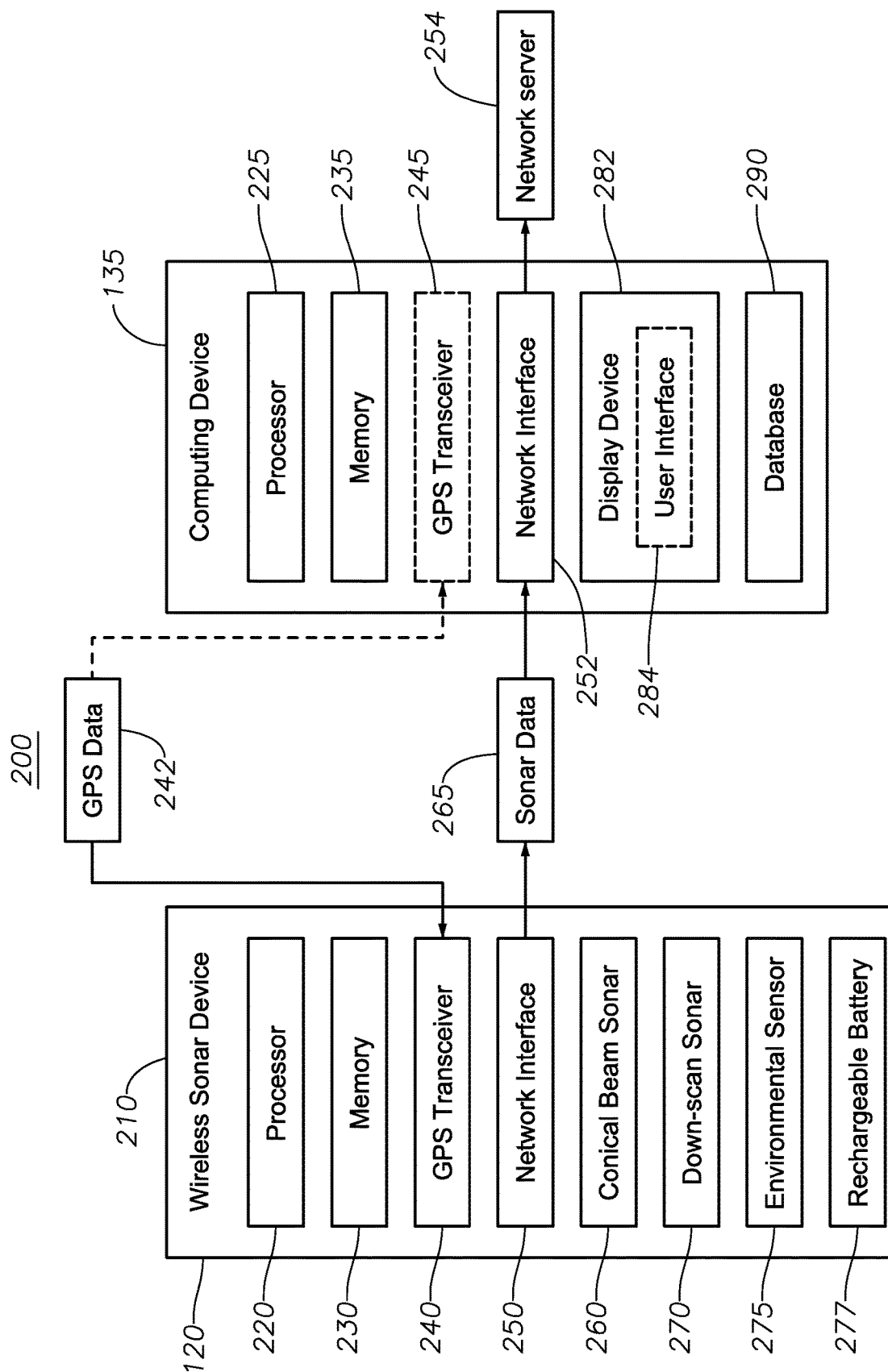
FIG. 2 illustrates a block diagram of a sonar system in accordance with various implementations described herein.

FIG. 2 illustrates a block diagram of a sonar system 200 in accordance with various implementations described herein. The sonar system 200 may include the wireless sonar device 120 and a computing device 135, which may be linked via a wired and/or wireless network to a network server 254. In one implementation, the wireless sonar device 120 may include various computing, processing, and storage components, such as at least one processor 220 and memory 230. The memory 230 may include instructions that cause the processor 220 to transmit sonar beams and receive sonar data 265 from two or more sonar transducer elements, e.g., the sonar transducer element 260 that produces a conical beam, and the down-scan sonar transducer element 270 that produces a trapezoidal beam. The memory 230 may further include instructions that cause the processor 220 to receive sensor data generated by one or more environmental sensors 275. In addition, the memory 230 may include instructions that cause the processor 220 to filter, process, or record the sonar data 265, which may be received while the wireless sonar device 120 is stationary in the body of water, for example, within the confines of an ice hole 110. The wireless sonar device 120 may further include a GPS module or GPS transceiver 240, and a rechargeable battery 277, as described herein. The GPS transceiver 240, may receive GPS satellite data 242, via a GPS antenna (not shown). The GPS antenna may be encapsulated within the waterproof housing 210 of the wireless sonar device 120 or embedded within its skin. The wireless sonar device 120 may include a wireless network interface 250, which may include a wireless transmitter. The memory 230 may further include instructions which cause the processor 220 to transmit the sonar data 265 to a wireless or computing device 135 using the network interface 250.

The computing device 135 may be a marine electronics device, MFD, smart phone, computer, laptop, tablet, etc. The computing device 135 may include a wireless network interface 252 for receiving the transmitted sonar data 265. In one implementation, the network interface 252 may also include a mobile wireless internet interface, which may allow the user of the computing device 135 to access a network server 254 on the internet. The computing device 135 may include various computing, processing, and storage components, such as at least one processor 225 and memory 235. The memory 235 may include instructions that cause the processor 225 to receive and process the sonar data 265. Further, the processor 225 may store, record and/or log the sonar data 265 in one or more databases 290. The computing device 135 may be configured to store and record multiple data logs. In another implementation, the computing device 135 may determine one or more sonar maps of a body of water using data log files. For instance, the computing device 135 may be configured to determine one or more sonar maps by stitching, combing, and/or joining multiple data log files together.

The computing device 135 may be configured to display data and/or various images, maps associated with the sonar data 265 on a display 282. The display 282 may further include a user interface 284. A fisherman may enter commands and information into the computing device 135 using a user interface 284, through input devices such as touch screens. The user interface 284 may allow the fisherman to adjust settings and/or configure one or more wireless sonar devices 120 in real time. Further, the computing device 135 may be configured to upload the sonar data 265 and/or sonar log files to a network server 254 via the network interface 252. The network server 254 may be a cloud server or other network server. Further, in some instances the computing device 135 may be configured to associate GPS positioning data to the data, data logs, images, maps etc., at any time, including prior to uploading to the network server 254. The GPS position information may be obtained from a GPS transceiver 240 which may be encapsulated within the waterproof housing 210 of the wireless sonar device 120, and/or from a GPS transceiver 245 located within the computing device 135.

In various implementations, the computing device 135 may be configured as a special purpose machine for interfacing with a wireless sonar device 120. Further, the computing device 135 may include various standard elements and/or components, including the at least one processor 225, the memory 235 (e.g., non-transitory computer-readable storage medium), at least one database 290, power, peripherals, and various other computing components that may not be specifically shown in FIG. 2. Further, the computing device 135 may include the display device 282 (e.g., a monitor or other computer display) that may be used to provide a user interface 284, including a graphical user interface (GUI). In FIG. 2, the display 282 is shown as an incorporated part of the computing device 135; however, the display 282 may be implemented as a separate component. Further, the user interface 284 may be used to receive one or more preferences from a fisherman of the display device 282 for managing or utilizing the sonar system 200, including interfacing with the wireless sonar device 120 and the two or more sonar transducer elements. As such, a fisherman may configure the desired behavior of the sensor system 200 and/or the two or more transducer elements via user-selected preferences using the user interface 284 associated with the display device 282.

Various elements and/or components of the system 200 that may be useful for the purpose of implementing the system 200 may be added, included, and/or interchanged, in manner as described herein. For example, the wireless device 135 may have built in functionality, and capabilities that may further assist the fisherman while fishing. For example, the wireless device 135 may have mobile wireless internet access. Mobile wireless internet access may allow a fisherman to access weather forecasts, radar maps, tidal information, moon phases, sunrise and sunset calendars and the like. The wireless device 135 may also have digital cameras, thereby allowing the fisherman to take pictures of his catches, and share them on social media sites and the like.

In one implementation, the wireless sonar device 120 may be encapsulated by a waterproof housing 210, wherein the material of waterproof housing 210 may be impervious to freshwater and/or saltwater. The waterproof housing 210 may provide protection for the plurality of transducer elements that may be encapsulated in the waterproof housing 210. In a further implementation, the wireless sonar device 120 may be castable, whereby a fisherman may cast or pitch the wireless sonar device 120 into the water. In one scenario, the waterproof housing 210 may include a fixture, whereby the fixture allows the wireless sonar device 120 to towed, suspended, aligned or retrieved by a fisherman. For example, the waterproof housing 210 may be attached using the fixture to a fishing line, cord or the like.

The wireless sonar device 120 may include multiple fixtures. For example, there may be a fixture located substantially on the top of the waterproof housing 210, whereby the fixture allows the wireless sonar device 120 to be suspended from a fishing line. There may be a fixture located substantially on the peripheral of the castable waterproof housing 210, whereby the fixture allows the wireless sonar device 120 to be drawn through the water while trolling. In one scenario, the wireless sonar device 120 may be drawn through the water by winding in the fishing line, or by towing the wireless sonar device 120 behind a moving watercraft. In another scenario, the waterproof housing 210 may be inherently buoyant. In yet another scenario, the wireless sonar device 120 may be ballasted such that the wireless sonar device 120 is submerged while ensuring that the edges of the ice hole 110 do not interfere with the operation of the sonar transducer elements. Referring to FIG. 1, each of the wireless sonar devices 120 may be floating within the confines of an ice hole 110 untethered. A fisherman may recover these untethered wireless sonar devices 120 by latching onto one or more of the fixtures using a boat hook or the like.

As mentioned above, the waterproof housing 210 may encapsulate a plurality of transducer elements. Examples of such transducer elements include a sonar transducer element 260, e.g., conical sonar transducer element, that produces a conical beam (or a substantially conical beam) and a down-scan sonar transducer element 270 that produces a trapezoidal beam (or a substantially trapezoidal beam). In one scenario, the conical sonar transducer element 260 may be substantially disk shaped, and the down-scan sonar transducer element 270 may be substantially rectangular or bar shaped.

In one implementation, the conical sonar transducer element 260 may operate at a different frequency than that of the down-scan sonar transducer element 270. For example, the frequency of the conical beam may be lower than that of the trapezoidal beam. In a further implementation the conical sonar transducer element 260 may operate at either 83 kHz (or thereabout) or 200 kHz (or thereabout), whereas the down-scan sonar transducer element 270 may operate at either 455 kHz (or thereabout) or 800 kHz (or thereabout).

The size of the wave front created by the transducer elements acoustic beam may affect the resolution of the return echo, and therefore the quality of the displayed image of objects of interest in the marine environment. For example, a wide and/or low frequency acoustic beam may result in diffused echo returns, which may be more suited to indicate the presence of fish in a wide area beneath the wireless sonar device 120, whereas the echo returns from a narrower and/or higher frequency acoustic beam may provide additional definition. This additional definition may provide a picture like representative of an object of interest in the marine environment. A narrower acoustic beam may therefore be more useful for identifying objects of interest in the marine environment.

The various sonar transducer elements of the wireless sonar device 120 may therefore have different coverage patterns, resolutions or functions. In one scenario, the conical beam may have a larger coverage area, but lower resolution than the trapezoidal beam of the down-scan sonar transducer element 270. A fisherman may use the conical beam to detect the presence or fish, whereas, he may use the trapezoidal beam to identify objects of interest within the marine environment, e.g., marine vegetation, reefs, sandbars, trees, man-made structures, wrecks or underwater debris. In one scenario, the fisherman may use the higher resolution trapezoidal beam of the down-scan sonar to determine whether he has position himself over an object of interest in the marine environment with which fish may be associated with, such as a wreck. The fisherman may further drill one or more holes 110 proximate to this first location, where he may deploy bait 140 and/or a lure.

The waterproof housing 210 may further include a network wireless interface or communication module 250. The network wireless interface 250 may allow the wireless sonar device 120 to communicate with other computing devices or wireless devices 135, such as a computer, laptop, smart phone, tablet, marine electronics device or multi-function display (MFD). The wireless communication may be via Bluetooth, Wi-Fi™ or cellular. It should be understood that other wireless devices 135, and communication methods, known to a person of ordinary skill in the art may be used herein. As mentioned above, the waterproof housing 210 may further include a global positioning system (GPS) transceiver or module 240. The GPS module 240 may receive GPS data 242, which may include location information, latitude and longitude, and time information. The GPS location of the wireless sonar device 120 may be wirelessly transmitted to a wireless device 135 at the fisherman's centralized location 130. The GPS module 240 may enable GPS positioning information, and/or time stamps, to be assigned to the sonar data 265 at a given location, or during trolling. The GPS positioning information may be assigned to the sonar data 265 by the wireless sonar device 120 before it is wirelessly transmitted, or it may be assigned after it is received at the centralized monitoring location 130 by the wireless device 135.

In a further implementation, the sonar data 265 and corresponding GPS positioning information, hereafter 'sonar data', may be superimposed on a bathymetric chart or map displayed on the screen of the MFD. In one scenario, GPS positioning information may be used to create a sonar map of a marine environment. In a further scenario, a fisherman may assign a waypoint, fishing notes etc., to a specific location on the bathymetric chart, topographic map or sonar map. In yet another scenario, the sonar data 265 may be logged to a storage device, transmitted, received, shared, synchronized with historical sonar data 265, or combination thereof.

In yet another implementation, a fisherman may use knowledge of the GPS location of a wireless sonar device 120 for retrieving the wireless sonar device 120. For example, in the case of ice fishing the wireless sonar device 120 may be floating within the confines of an ice hole 110, and not be directly tethered to the fisherman's centralization location 130. As such, it may be difficult to locate the wireless sonar device 120 in adverse conditions and/or at night. The fisherman may enter the GPS position of the wireless sonar device 120 into any device that can navigate to a GPS location and direct him to the wireless sonar device 120.

In one implementation, the wireless sonar device 120 may further include one or more environmental sensors 275. The environmental sensors 275 may be configured to determine various characteristics of the body of water. For example, the environmental sensors 275 may measure the chlorophyll concentration, temperature, pressure, oxygen concentration, light intensity, electrolyte (salt) concentration and acidity of the body of water. Since environmental conditions may affect the location of fish and/or fish schools. Determining various environmental characteristics of the body of water may assist a fisherman in locating a desirable place to game fish. For example, the boundary between high chlorophyll concentrations and very low concentrations may yield higher fish populations, as smaller bait fish tend to feed on chlorophyll immersed in the water, and the gathering of bait fish tends to attract larger game fish. As such, access to environmental data may assist a fisherman in learning where, and when game fish may be gathering.

Further, the environmental data may be wirelessly transmitted to a wireless device 135. The environmental data may also be associated with sonar data 265, GPS positioning information and/or time stamps; as such it may also be superimposed on a bathymetric chart etc., as described herein.

In one implementation, the wireless sonar device 120 may have status indicators. The status indicators may be situated on the outside of its waterproof housing 210. Alternatively, the status information may be wirelessly transmitted to a wireless device 135. Status information may pertain to many health parameters of the sonar wireless device 120. For example, a rechargeable battery 277 may be encapsulated within the waterproof housing 210 of the wireless sonar device 120, and a battery level may be indicated on the waterproof housing 210 and/or transmitted to the wireless device 135. In one scenario, the rechargeable battery 277 may be charged via a suitable connector, or inductively, so as to retain the waterproof integrity of any waterproof housing 210 seal when charging. Status information for the transducer elements, GPS module 240, environmental sensors 275, wireless connection etc. may also be wirelessly transmitted to a wireless device 135.

In one implementation, the wireless sonar device 120 and/or the wireless device 135 may process the sonar data 265. The sonar data 265 may be processed to enhance the detection and/or identification of an object of interest within the marine environment. For example, marine vegetation, reefs, fishes, lures, sandbars, trees, man-made structures, wrecks or underwater debris. Processing of the sonar data 265 may also include filtering the sonar data 265 to remove interference or noise pollution that may be attributed to other sonar sources, e.g., watercrafts propellers and engines, other sonar devices. Further, as disclosed herein, processing may also include assigning GPS positions and environmental sensor data to the sonar data 265 to create a sonar map of a body of water. Processing may further include stitching, combing, and/or joining multiple sonar data 265 or log files together to create one or more sonar maps. In one scenario, these log files may have been recorded by the fisherman from a plurality of sonar devices 120.

In a further implementation, the sonar data 265 may be processed to identify an object of interest, such as a fish or wreck, within the sonar data 265. In one scenario, the wireless device 135 may notify the user to the presence of fish by an alarm. In one implementation, the user may define an alert zone within the boundaries of a sonar beam, whereby an alarm is only generated if the processed sonar data 265 indicates that a fish is within the defined alert zone.

In yet another implementation, the sonar data 265 may be processed such that a depth may be associated with objects of interest within the marine environment. Knowing the depth of one or more game fishes, bait fishes and/or lures 140 may further assist the fisherman. In one scenario, the fisherman may use this information to position lures 140 at the same depth as fish identified in the sonar data 265.

As mentioned above, the wireless sonar device 120 may include a down-scan sonar transducer element 270, which may have a substantially trapezoidal beam. In one scenario, the trapezoidal beam may be broad in width, but narrow in thickness. The trapezoidal beam of a first wireless sonar device 120 may be positioned to reduce interference from one or more additional wireless sonar devices 120 that may be in the vicinity. For example, the trapezoidal beam of the first wireless sonar device 120 may be orientated such that its trapezoidal beam is substantially parallel to the trapezoidal beams of one or more additional wireless sonar devices 120, which may otherwise interfere with each other.

In one implementation, the sonar transducer elements of the wireless sonar device 120 may operate at multiple frequencies. In a further implementation, the sonar transducer elements of a wireless device 120 may be programmed to operate at different frequencies or frequency channels. This feature may be used to reduce interference from other noise sources, including additional wireless sonar devices 120, which may be in the vicinity. For example, a first wireless sonar device 120 may be configured to operate on a first frequency channel, while a second wireless transducer device 120 may be configured to operate on a second and different frequency channel. The spacing of the different frequency channels exists to avoid interference. In one scenario, the different frequency channels may be preprogrammed into the wireless sonar device 120 by a manufacture. In another scenario, the different frequency channels may be directly programmed into each wireless sonar device 120 by a fisherman. For example, the fisherman may program a frequency channel directly into the wireless sonar device 120 using a user interface, which may be located on the wireless sonar device 120, and/or on the wireless device 135. As such, the fisherman may be able to change the operating frequency of the various transducer elements encapsulated within the waterproof housing 210 of a wireless sonar device 120 in real time wirelessly. In one scenario, this may done in response to an analysis of local noise sources. For example, the wireless sonar device 120 may passively listen for noise sources on each of its frequency channels to determine the ambient noise. The fisherman may then determine a frequency channel based on this analysis.

In another implementation, the sonar transducer elements may be configured to operate on different time slots. This feature may be used to reduce interference from other noise sources, including additional wireless sonar devices 120, which may be in the vicinity. For example, a first wireless device 120 may be programmed to operate on a first time slot, while a second wireless transducer device 120 may be programmed to operate on a second and different time slot. The spacing of the time slots is created to minimize interference. In another implementation, various wireless sonar devices 120 may be programmed to ping their transducer elements sequentially and/or randomly (pseudo-randomly) with respect to each other. This feature may also reduce interference with other wireless sonar devices 120 and/or noise sources in the vicinity.

In another implementation, an integration of sonar data 265 from a plurality of sonar transducer elements may be used to accurately detect, and identify objects of interest in the marine environment. In particular, sonar data 265 may be used to identify game fish and marine vegetation, reefs, sandbars, fishes, trees, man-made structures, wrecks or underwater debris that may be associated with game fish in the marine environment.

Figure 3:
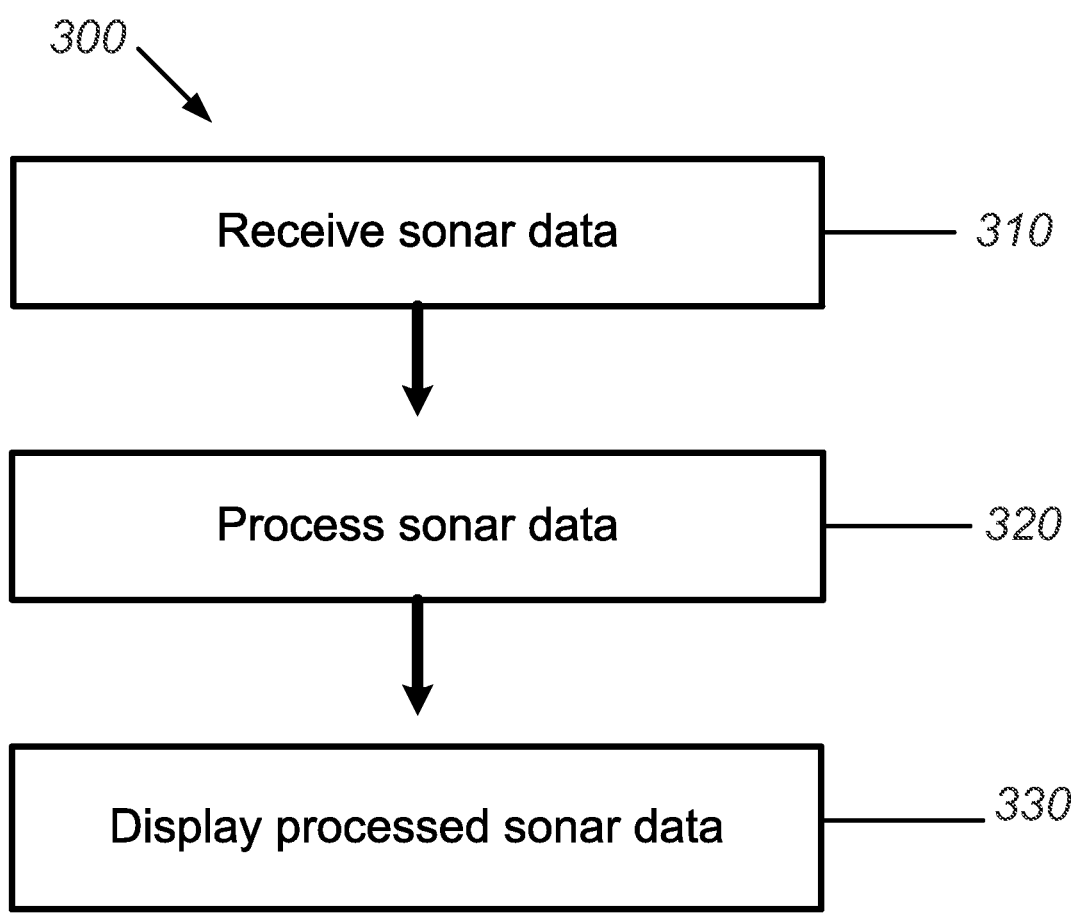
FIG. 3 illustrate a flow diagram of a method for receiving, processing and displaying sonar data in accordance with various implementations described herein.

FIG. 3 illustrates a flow diagram of a method 300 for receiving, processing and displaying sonar data 265 in accordance with various implementations described herein. In one scenario, method 300 may be performed by any computer system 135, including a marine electronics device and the like. The computer system 135 may be in wireless communication with one or more wireless sonar devices 120.

In one implementation, method 300 may be performed by one or more computer applications, where the computer applications may implement one or more of the steps described below. It should be understood that while method 300 indicates a particular order of execution of operations, in some implementations certain portions of the operations may be executed in a different order, and on different systems. Further, in some implementations, additional operations or steps may be added to method 300. Likewise, some operations or steps may be omitted.

At block 310, sonar data 265 may be received from a wireless sonar device 120. In one implementation, the wireless sonar device 120 may have a plurality of sonar transducer elements, e.g., a sonar transducer element 260, which produces a conical beam, a down-scan sonar transducer element 270, which produces a trapezoidal beam, and a side-scan sonar transducer element. In one scenario, sonar data 265 may be received from more than one wireless sonar device 120. In a further implementation, the sonar data 265 may further include GPS positioning information, time stamps, status information for the wireless sonar device 120, and/or environmental information, as described above.

At block 320, the sonar data 265 may be processed to accurately detect and identify objects of interest in the marine environment. The conical beam sonar 260 may be used for the detection of fish. The trapezoidal beam of the down-scan sonar 270 may be used for the identification of objects of interest within the marine environment, such as trees, and may have a higher sonar resolution than the data generated using the conical beam sonar 260.

In one implementation, the sonar data 265 may be filtered to reduce interference or noise pollution from other noise sources. In a further implementation, the sonar data 265 may be processed to enhance the detection of fish. In another implementation, the sonar data 265 may be processed such that a fisherman may be notified of the presence of fish or an object of interest in the marine environment by generation of an alarm.

In a further implementation, the sonar data 265 may be processed to enhance the identification of objects of interest within the marine environment. In another implementation, the sonar data 265 may be processed such that a depth can be assigned to the object of interest. For example, depth increments may be displayed on a screen 282 with the corresponding processed sonar data 265.

In yet another implementation, the sonar data 265 may be processed so that a GPS location and/or time stamp may be assigned to sonar data 265 as it is received. GPS location may be assigned to the sonar data 265 while the wireless sonar device 120 is being trolled through the water or at a given location. GPS positioning information may be used to superimpose the sonar data 265 onto a bathymetric chart or topographic map, thereby creating a sonar map of a marine environment. The GPS data files may have been obtained from a plurality of sonar devices 120, casting and/or trolling's. The processing may also include synchronizing the sonar data 265 with sonar data 265 obtained from other sources, such as historical data logs, which may have been previously recorded by the fisherman and/or obtained from other sources.

In one implementation, the sonar data 265 may be processed to make it easier for the fisherman to interpret, and distinguish between objects of interest in the marine environment. For example, various colors, symbols and/or icons may be assigned to different objects of interest identified in the marine environment. In a further implementation, processing may include using interpolation, whereby interpolation of the sonar data 265 (point cloud) may enhance the contours and/or boundaries of an object of interest in the marine environment, thereby making it easier for a fisherman to identify the object. For example, the bottom topography depth contour of a lake, riverbed or seabed may be interpolated and/or shaded to make it easier for a fisherman to visualize.

At block 330, the processed sonar data 265 may be displayed. In one scenario, the screen 282 may be used to depict the sonar data from one or more wireless sonar devices 120. In another scenario, a separate screen 282 may be used for each wireless sonar device 120. The screen 282 may depict real-time sonar data 265 and/or historical sonar data 265. In a further implementation, the screen 282 may be split, wherein a portion of the screen may display the sonar data 265 from the conical sonar transducer element 260, and a portion may display sonar data 265 from the down-scan sonar transducer element 270. The sonar data 265 may be displayed as one or more sonar images, sonar videos and/or sonar maps of the marine environment. In one scenario, the sonar images, sonar videos and sonar maps may be superimposed on one or more bathymetric charts or topographic maps.

The display 282 may also depict other information. For example, navigational information may also be displayed on the screen 282. In one implementation, the fisherman may use navigation information to locate and retire a wireless sonar device 120 that may transmit its location as part of the sonar data 265. In one scenario, the fisherman may use this feature to navigate to a waypoint that may be associated with a desirable fishing location that has been previously saved by the fisherman. One or more alarms may also be display when an object of interest is detected and/or identified within the sonar data 265.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Marine Electronics Device

Figure 4:
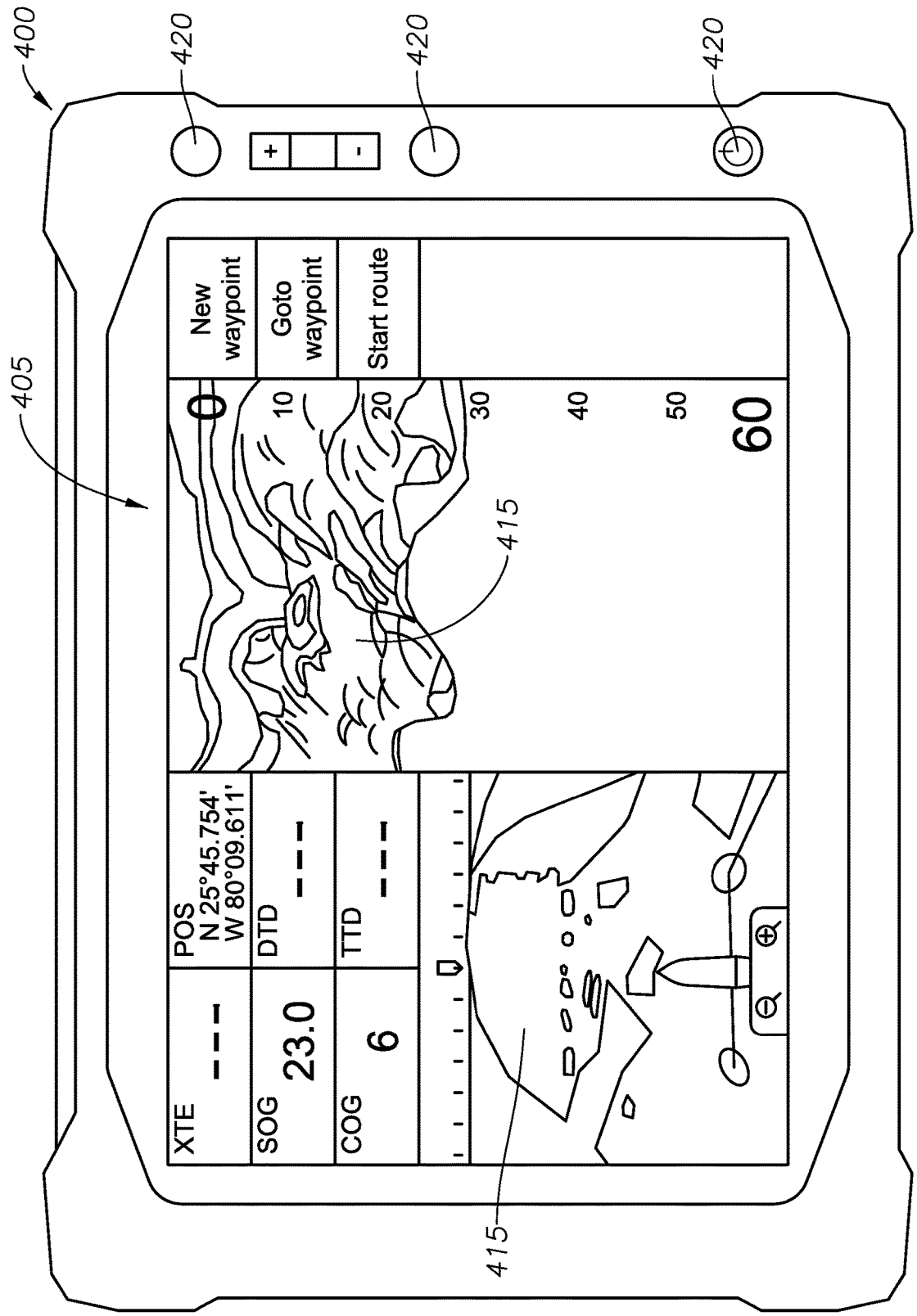
FIG. 4 illustrates a schematic of a marine electronics device in accordance with various implementations described herein.

FIG. 4 illustrates a schematic of a marine electronics device 400 in accordance with implementations of various techniques described herein. The marine electronics device 400 includes a screen 405. In certain implementations, the screen 405 may be sensitive to touching by a finger. In other instances, the screen 405 may be sensitive to the body heat from a finger, a stylus, or responsive to a mouse. The marine electronics device 400 may be attached to a National Marine Electronics Association (NMEA) bus or network. The marine electronics device 400 may send or receive data to or from another device attached to the NMEA 2000 bus. For example, the marine electronics device 400 may transmit commands and receive data from a motor or a sensor using an NMEA 2000 bus. In some implementations, the marine electronics device 400 may be capable of steering a vessel and controlling the speed of the vessel, i.e., autopilot. For instance, one or more waypoints may be input to the marine electronics device 400, and the marine electronics device 400 may be configured to steer the vessel to the one or more waypoints. Further, the marine electronics device 400 may be configured to transmit and/or receive NMEA 2000 compliant messages, messages in a proprietary format that do not interfere with NMEA 2000 compliant messages or devices, or messages in any other format. In various other implementations, the marine electronics device 400 may be attached to various other communication buses and/or networks configured to use various other types of protocols that may be accessed via, e.g., NMEA 2000, NMEA 0183, Ethernet, Proprietary wired protocol, etc.

The marine electronics device 400 may be operational with numerous general purpose or special purpose computing system environments and/or configurations. The marine electronics device 400 may include any type of electrical and/or electronics device capable of processing data and information via a computing system. The marine electronics device 400 may include various marine instruments, such that the marine electronics device 400 may use the computing system to display and/or process the one or more types of marine electronics data. The device 400 may display sonar data 265, for example, sonar and sensor data, and images associated with them. The marine electronic data types may include various chart data, radar data, sonar data 265, sensor data including environmental, steering data, dashboard data, navigation data, fishing data, engine data, and the like. The marine electronics device 400 may include one or more buttons 420, which may include physical buttons or virtual buttons, or some combination thereof. The marine electronics device 400 may receive input through a screen 405 sensitive to touch or buttons 420.

In some implementations, according to various techniques described herein, the marine electronics device 400 may be configured to simultaneously display images associated with one or more sonar transducer elements, environmental sensors, and the like. For example, the marine electronics device 400 may be configured to simultaneously display images associated with a plurality of sonar transducer elements, including sonar transducer elements which produces conical and substantially trapezoidal beams. Further, the marine electronics device 400 may also be configured to simultaneously display images and/or data associated with various status indicators and/or environmental sensors. For example, the battery level of a rechargeable battery 277 encapsulated within a wireless device 120. In some instances, in various display modes of operation, the marine electronics device 400 may be configured to simultaneously display images and/or data associated with the marine environmental on the screen 405. Further, sonar data 265 related to detected environmental conditions of water may be displayed on the screen 405 of the marine electronics device 400 by overlaying various sonar images on chart and sonar images.

The marine electronics device 400 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. Further, the GPU may generate user interfaces, including graphical user interfaces (GUIs) that provide, present, and/or display the output data. The GPU may also provide objects, such as menus, in the GUI. In some instances, a user may provide input by interacting with objects, and the GPU may receive input from interaction with objects and provide the received input to the CPU. Further, in some instances, a video adapter may be provided to convert graphical data into signals for a monitor, such as, e.g., a multi-function display (MFD 400). The monitor (i.e., MFD 400) includes a screen 405. In various instances, the screen 405 may be sensitive to touch by a human finger, or the screen 405 may be sensitive to body heat from a human finger, a stylus, or responsive to a mouse.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured for connection to a GPS receiver system and/or a marine electronics device or system. The GPS system and/or marine electronics device or system may be connected via a network interface. For instance, the GPS receiver system may be used to determine position data for the vessel on which the marine electronics device 400 is disposed. Further, the GPS receiver system may transmit position data to the marine electronics device 400. In other instances, any positioning system known to those skilled in the art may be used to determine and/or provide the position data for the marine electronics device 400.

The marine electronics device 400 may receive external data via a LAN or a WAN. In some implementations, external data may relate to information not available from various marine electronics systems. The external data may be retrieved from the Internet or any other source. The external data may include atmospheric temperature, atmospheric pressure, tidal data, weather, temperature, moon phase, sunrise, sunset, water levels, historic fishing data, and/or various other fishing data.

In one implementation, the marine electronics device 400 may be a multi-function display (MFD) unit, such that the marine electronics device 400 may be capable of displaying and/or processing multiple types of marine electronics data. FIG. 4 illustrates a schematic diagram of an MFD unit in accordance with implementations of various techniques described herein. In particular, the MFD unit may include the computing system, the monitor (MFD 400), the screen 405, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A portable sonar device, the portable sonar device comprising:
   a waterproof housing having:
      a conical sonar transducer element;
      a down-scan sonar transducer element;
      a rechargeable battery;
      a battery level indicator;
      a wireless data communication element configured to communicate with a remote marine electronics device;
      a processor; and
      a memory including program product stored thereon, wherein the computer program product is configured, when executed by the processor, to:
         cause transmission of sonar data from at least one of the conical sonar transducer element or the down-scan sonar transducer element to the remote marine electronics device;
         determine a battery level of the rechargeable battery;
         cause transmission of an indication of the battery level of the rechargeable battery to the remote marine electronics device and to the battery level indicator, such that the battery level is indicated locally on the waterproof housing and remotely at the remote marine electronics device;
         analyze the sonar data to determine the presence of a fish in the corresponding underwater environment; and
         cause transmission, in response to determining the presence of the fish, of an indication of the presence of the fish to cause an alarm to be provided to a user of the remote marine electronic device.

2. The portable sonar device of claim 1, wherein the waterproof housing further comprises a global positioning system (GPS) module.

3. The portable sonar device of claim 1, wherein the rechargeable battery is configured to be charged via a connector or inductively.

4. The portable sonar device of claim 1, wherein the waterproof housing further comprises one or more environmental sensors.

5. The portable sonar device of claim 1, wherein the conical sonar transducer element is substantially used to detect the presence of fish and the down-scan sonar transducer element is substantially used to identify objects within a marine environment.

6. The portable sonar device of claim 1, wherein the conical sonar transducer element operates at about 83 kHz or about 200 kHz, and the down-scan sonar transducer element operates at about 455 kHz or about 800 kHz.

7. The portable sonar device of claim 1, wherein the waterproof housing further comprises a buoyancy component.

8. The portable sonar device of claim 1, wherein the waterproof housing further comprises a side-scan sonar transducer element.

9. A castable sonar device, the castable sonar device comprising:
  a waterproof housing configured to float on a surface of a body of water, wherein the housing comprises:
    a conical sonar transducer element;
    a down-scan sonar transducer element;
    a rechargeable battery;
    a battery level indicator;
    a wireless data communication element configured to communicate with a remote marine electronics device;
    a processor; and
    a memory including program product stored thereon, wherein the computer program product is configured, when executed by the processor, to:
      cause transmission of sonar data from at least one of the conical sonar transducer element or the down-scan sonar transducer element to the remote marine electronics device and to the battery level indicator, such that the battery level is indicated locally on the waterproof housing and remotely at the remote marine electronics device;
      determine a battery level of the rechargeable battery;
      cause transmission of an indication of the battery level of the rechargeable battery to the remote marine electronics device;
      analyze the sonar data to determine the presence of a fish in the corresponding underwater environment; and
      cause transmission, in response to determining the presence of the fish, of an indication of the presence of the fish to cause an alarm to be provided to a user of the remote marine electronic device.

10. The castable sonar device of claim 9, wherein the waterproof housing further comprises a global positioning system (GPS) module.

11. The castable sonar device of claim 9, wherein the rechargeable battery is configured to be charged via a connector or inductively.

12. The castable sonar device of claim 9, wherein the waterproof housing further comprises one or more environmental sensors.

13. The castable sonar device of claim 9, wherein the conical sonar transducer element is substantially used to detect the presence of fish and the down-scan sonar transducer element is substantially used to identify objects within a marine environment.

14. The castable sonar device of claim 9, wherein the conical sonar transducer element operates at about 83 kHz or about 200 kHz, and the down-scan sonar transducer element operates at about 455 kHz or about 800 kHz.

15. The castable sonar device of claim 9, wherein the waterproof housing further comprises a buoyancy component.

16. The castable sonar device of claim 9, wherein the housing includes a fixture that is configured for attachment to a fishing line or cord.

* * * * *